United States Patent [19]

Yao

[11] Patent Number: 4,987,281
[45] Date of Patent: * Jan. 22, 1991

[54] APPARATUS FOR CONTINUOUS-DIRECT-RESISTANCE HEATING OF LONG-LENGTH PARTICLES

[75] Inventor: Yugo Yao, Kanagawa, Japan

[73] Assignee: Neturen Company Limited, Tokyo, Japan

[*] Notice: The portion of the term of this patent subsequent to Apr. 18, 2006 has been disclaimed.

[21] Appl. No.: 312,056

[22] Filed: Feb. 17, 1989

Related U.S. Application Data

[63] Continuation-in-part of Ser. No. 184,614, Feb. 9, 1989, Pat. No. 4,822,969.

[30] Foreign Application Priority Data

Nov. 30, 1987 [JP] Japan ................................ 62-300127

[51] Int. Cl.$^5$ ................................................ H05B 1/00
[52] U.S. Cl. ...................................... 219/50; 219/116; 219/155
[58] Field of Search ........................... 219/50, 116, 155

[56] References Cited

U.S. PATENT DOCUMENTS

| | | | |
|---|---|---|---|
| 553,923 | 2/1896 | Lemp | 219/116 |
| 1,387,023 | 8/1921 | Swift | 219/155 |
| 1,683,209 | 9/1928 | Ruben | 219/155 |
| 3,290,481 | 12/1966 | Hinkel | 219/155 |
| 4,822,969 | 4/1989 | Yao | 219/50 |

FOREIGN PATENT DOCUMENTS 46-36485 12/1971 Japan .
55-116064 1/1980 Japan .
718835 11/1954 United Kingdom .

Primary Examiner—Clifford C. Shaw
Attorney, Agent, or Firm—Wenderoth, Lind & Ponack

[57] ABSTRACT

The present invention relates to an apparatus for continuous-direct-resistance heating of long-length articles wherein the travelling long-length article is made to contact with roll electrodes disposed in a specified spacing, then made to pass through an annular transformer disposed between the roll electrodes.

Conductive members with sufficiently less electrical resistance than that of the long-length article located between the both electrodes are disposed on the periphery of the transformer with the both ends thereof connected to the roll electrode through a slider, thereby a current being induced in the long-length article with the conductive member as the retrace, which heats the long-length article having a higher resistance very efficiently, but does not result in an external voltage nor any electrical hazards along the production line in which the apparatus is installed.

One embodiment of the apparatus comprises three roll electrodes, two transformers and conductive members being disposed on the periphery of the transformer connected to the neighboring roll electrode, the power being fed to each transformer from two single-phase transformer in a Scott connection with a three-phase power supply, thus providing heating without developing imbalance in the three-phase voltage.

19 Claims, 8 Drawing Sheets

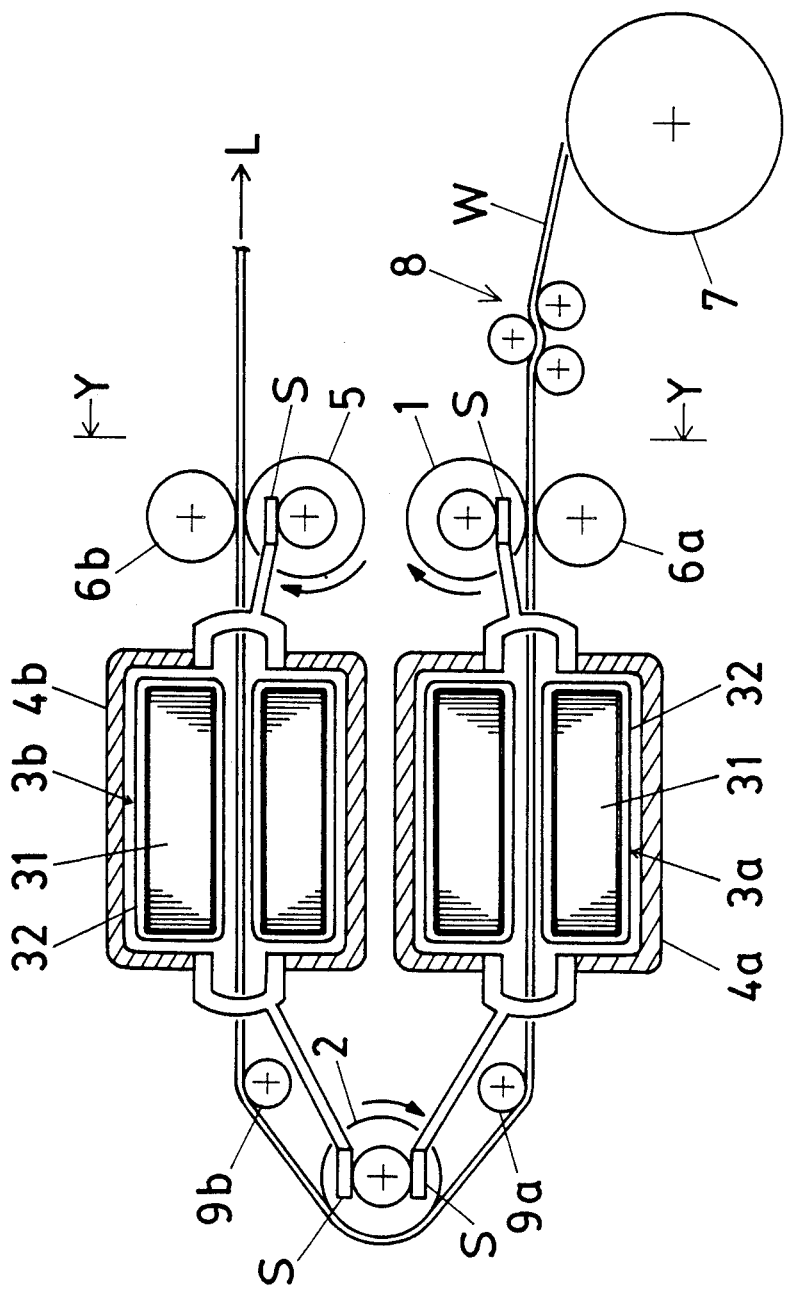

PRIOR ART FIG.7

APPARATUS FOR CONTINUOUS-DIRECT-RESISTANCE HEATING OF LONG-LENGTH PARTICLES

This is a continuation-in-part application of Ser. No. 07/184,614, filed Feb. 9, 1989, now U.S. Pat. No. 4,822,969.

FIELD OF THE INVENTION

The invention relates to an apparatus for heating of long-length articles formed as strips, wires, bars and the like made of steel, non-ferrous or other conductive materials to a specified temperature according to a variety of applications by direct-resistance heating while causing the said articles to travel continuously.

DESCRIPTION OF THE PRIOR ART

There are two types of the conventional direct-resistance-heating apparatuses which heat the long-length articles while causing them to travel continuously.

The first is an apparatus used for heating steel wire, bar or the like for the purpose of increasing the strength by means of heat treating including hardening and tempering as disclosed in U.S. Pat. No. 3,929,524 or for heating, for various purposes, of long-length articles formed as strips, wires or bars made of ferrous or non-ferrous metal wherein the basic arrangements is illustrated in FIG. 5 (a) to (c).

The said arrangement is characterized by the use of roll electrodes and is called "external power supply type".

Reference is made to FIG. 5 (a) for the case of wire. Opposed roll electrodes RO1 and RO2, each consisting of rolls a and b with their circumferencial faces opposed to each other with a wire-feeding path L1 in between are disposed in a specified spacing.

Either one or both of the rolls (b in Figure) in the opposed electrodes RO1 and RO2 are connected to the power source E through a slider S.

The travelling wire W1 passes through the opposed rolls a and b in contact with their circumferential surfaces and resistance heating takes place between the opposed electrodes RO1 and RO2.

In a certain case, the power is fed from the two sources E with three sets of opposed roll electrodes RO1 to RO3 being arranged as illustrated in FIG. 5 (b), whereas in another case, the different current values between the opposed roll electrodes RO1, RO2 and between the opposed roll electrodes RO2,RO3 permit the conduction of current to the wire W1.

In either of the apparatuses in the above FIGS. 5 (a) and (b), heating voltage appears at the opposite ends of wire W1 within the heating zone and may result in leakage of the conducting current outside the heating zone through the travelling wire W1, thereby damaging other equipment or causing excessive heating of the wire W1 or exposing the operators in the vicinity to an unexpected hazard.

To prevent them from happening, annular current-limiting reactors CH of which annulus permit the wire W1 to travel therethrough have to be disposed on one or both sides of the feeding path L1 outside the heating zone.

Therefore, this kind of apparatus necessitates current-limiting reactor CH, thereby causing longer equipment lines, resulting in higher equipment as well as producing casts.

There is the type of external power source as is disclosed in Japanese Utility Model No. 116,064-'80 which eliminates the current-limiting reactors CH, wherein three sets of the opposed roll electrodes RO1 to RO3 are disposed as illustrated in FIG. 5 (c) and one pole (−pole for DC) of a power supply E (AC or DC) is connected to the opposed roll electrodes RO2 and the other pole (+pole for DC) is connected to the opposed roll electrodes RO1 and RO3 while both or either one of the opposed roll electrodes RO1 and RO3 is grounded. In this arrangement, the currents between opposed electrodes being i11 and i12 as illustrated in the Figure, the current loads, each on opposed roll electrodes RO1 and RO3 are nearly one half the load on the opposed electrode RO2 and, being grounded, no voltage appears at the end of the heating zone, resulting in no current leaking outside the heating zone through the wire W1.

This type of arrangement has two shortcomings although it succeeded in eliminating the current-limiting reactor CH.

That is, the arrangement shown in FIG. 5(c) is likely to develop sparking due to greater current load on the opposed roll electrodes RO2, thereby resulting in a spark scar in the wire W1 or heavier wear of the said opposed roll electrode RO2 than the other electrodes.

Another shortcoming is that an excessive or insufficient temperature as compared to a desired one prevails for some time from the start to the normal operation because, taking an example of the wire W1 being caused to travel in the arrow direction, the equivalence of the inherent resistance R11 of the wire W1 between the opposed roll electrodes RO1,RO2 to the inherent resistance of R12 in the wire W1 between the opposed roll electrodes RO2,RO3 when not heated, causes the current to flow in i 12 > i 11 at the start and in i 12 < i 11 at the normal operation, thus adversely affecting the quality or yield ratio due to an instability in heating from excess or insufficiency with regard to a desired temperature. Another type of prior art device is disclosed in Japanese Utility Model No. 36,485-71 and involves an apparatus for annealing and the like by direct-resistance heating of the wire workhardened in the process of drawing in order to facilitate another drawing into extra fine wire to use as a strand made of copper, aluminum or the like at the workshop of the cable manufacturers or for preheating or the like by resistance heating of stranded or drawn wires in the process of applying a plastic coating to the surface thereof.

The basic arrangement of the said apparatus is illustrated in FIG. 6 (a).

This is called the sheave type, characterized by forming of a loop of articles for heating by the conductive sheaves ES1 and ES2.

The said sheave ES1 is so disposed that the wire-feeding path L1 is tangential to the sheave ES1 and the Sheave ES2 is spaced a given distance from the sheave ES1 also away from the said wire-feeding path L1.

The wire W1 travels around once or twice along the path formed both by the parallel tangents ta and tb shared commonly by both sheaves ES1 and ES2 and by each outer half circumference thereof.

An annular transformer T1 connected to a power supply (not shown) is disposed on a given path, for instance, on the path ta.

The said transformer T1 when fed, induces the secondary current in the wire W1 on the path ta with the wire W1 on the path tb as retrace so that the wire is heated.

This type of apparatus can only be applied to a flexible wire W1 and not to a wide strip even if it is flexible. Such an arrangement is shown in FIG. 6 (b) in which the sheaves ES1, ES2 are replaced with wide conductive rolls ER1 and ER2, the strip W2 has contact with the circumferencial surface of the roll ER1 in double tandem, thus causing a torsion in the strip W2 to a degree depending upon the width or flexibility of the strip W2, resulting in extreme difficulty of permitting the strip W2 to travel in close contact with each surface of rolls ER1 and ER2, making it almost impossible for the strip to travel in close contact when the rolls ER1 and ER2 are spaced apart by as much as several meters and the width of a strip W2 is as wide as 500 mm or so.

The sheave type has not been applied to the heating of strips W2 since improper contact of the strip W2 with each roll ER may result in uneven heating and develop sparking which may leave scars on the products.

The said type requires insulation for the equipment because of the hazard of leaking of high voltage current through the devices with which the ungrounded sheave ES and wire W1 have contact, requiring grounding of either one of the sheaves ES1 or ES2 when a large current is fed to the transformer T1.

There is an apparatus which is a variation of the sheave type using a transformer T1 as is disclosed in British Pat. No. 718,835 for heating of strips. The basic arrangement thereof is shown in FIG. 7. Rolls Rs and Rt are disposed in the vessel V filled with molten metal, salt or the like A and a roll Ru is disposed above the vessel V with a transformer T1 located between rolls Rs and Ru on which the flexible strip W2 is caused to travel in the direction shown by the arrow.

The transformer T1, when fed, as molten metal, salt and the like A are conductive, induces current i to flow in the secondary circuit formed through moten metal, salt or the like A, thus heating the strip W2 located between rolls Rs and Rt.

In this type of apparatus, the roll Ru in high voltage when molten metal A is grounded as in the apparatus shown in FIG. 6 (b) and the use of conductive liquid makes it hazardous to human health and unfavorable to the quality of the products because of strips being heated with the said conductive liquid attached thereon.

The said apparatus is of course not applicable to thick unflexible strips.

SUMMARY OF THE INVENTION

The object of the invention is to provide a continuous direct-resistance-heating apparatus whereby long-length strips such as wires, bars or other articles made of steel, non-ferrous or other conductive materials are heated but little current is leaked outside of the heating zone, no current-limiting reactor is needed and requiring no additional current-conducted roll is needed, thus insuring safety and space saving.

An additional object of the invention is to provide a direct-resistance-heating apparatus permitting continuous, efficient and uniform heating of long-length articles.

The other features and advantages of the invention will be appreciated in the following description with reference to the attached drawings.

BRIEF DESCRIPTION OF THE DRAWINGS

FIG. 1 (b) is a cross section taken on line X—X of FIG. 1(a) for long-length strips.

FIG. 1 (e) is a schematic diagram of an electrical circuit used in the apparatus of FIG. 1 (a).

FIG. 6 (b) is a perspective view of the apparatus of conventional sheave type which is diverted to strip heating.

FIG. 7 is a front view of a conventional direct-resistance-heating apparatus for strip heating using a transformer.

DETAILED DESCRIPTION OF PREFERRED EMBODIMENTS

Reference is made to FIG. 1 (a) to (d) illustrating an embodiment of the present invention for heating of a strip.

Figure 1A:
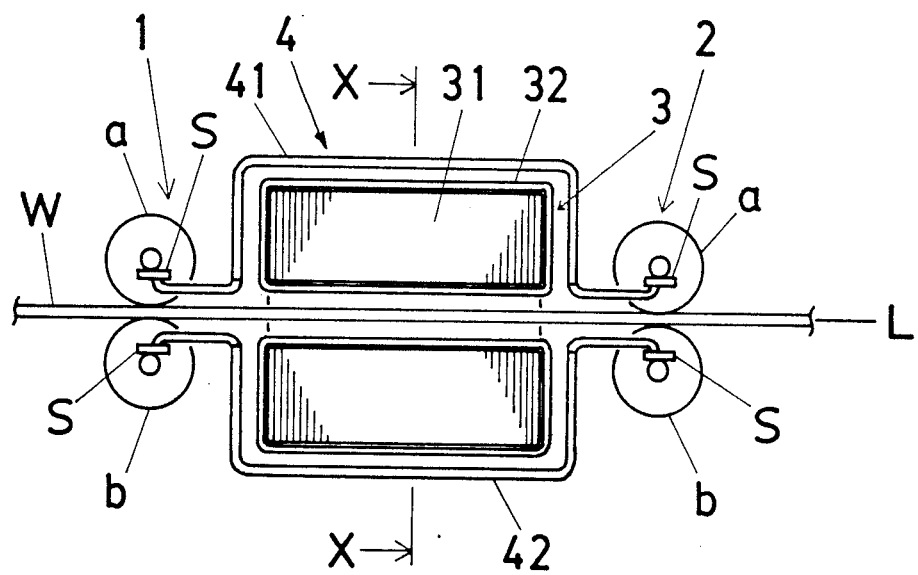
FIG. 1 (a) is a front view of an embodiment of the present invention.
FIGS. 1(c) and 1(d) are modifications of the cross section shown in FIG. 1(b).

1 and 2 of FIG. 1(a) are the first and second roll electrodes respectively disposed in a specified spacing along a strip-feeding path L.

Each roll electrode 1,2 is so arranged that rolls a and b made from conductive materials with longer axial length than the width of the strip W to be heated are opposed to each other such that the circumferencial surfaces thereof are separated by a specified gap with the feeding path L in between, the gap which is so arranged to permit the strip W to travel in contact with the circumferencial surfaces of the rolls a and b being sandwiched therebetween.

3 in the Figures is an annular transformer disposed between the first roll electrode 1 and the second roll electrode 2.

Figure 1B:
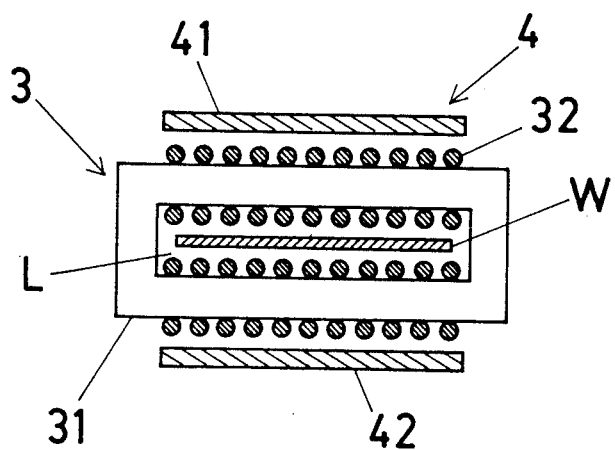
Figure 1C:
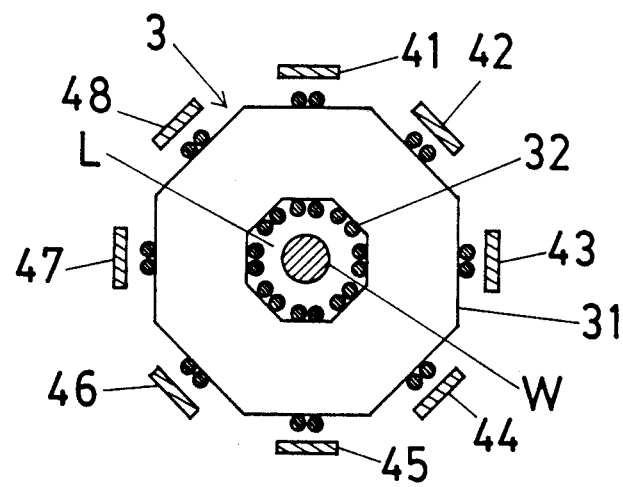

The said transformer 3 consists of an iron core 31 made of silicon steel sheets and the like having good property for the magnetic path, laminated to a specified thickness, for instance, formed in a rectangular annular form as is shown in FIG. 1(b) illustrating the cross section taken on line X—X and of primary coil 32 turned around the said iron core 31 from the outside to the inside and vice versa.

Inside the annular transformer 3, a strip-feeding path L is provided.

It is optimum for the said primary coil 32 to be turned so as not to cause the strip travelling through the path L to vibrate by electro-magnetic machine force or in other words to maintain symmetry with respect to the strip-feeding path L, in order to offset the electro-magnetic machine force.

Both terminals of the said primary coil 32 are connected to a power supply not shown in the Figures. In the opposing location close to the said primary coil 32 on the outer periphery of transformer 3, conductive members 4 with a specified width and thickness made from good conductive materials such as copper and the like 41 and 42 are provided.

The conductive members 41 and 42 are symmetrical with respect to the strip-feeding path L and parallel thereto.

The conductive members 41 and 42 are bent along the end face of the transformer 3 and connected to the roll a and b in each roll electrode 1 and 2 through each slider S.

The above connecting method is an example.

Both ends of conductive members 41 and 42 may be united to connect with either one of the rolls in each roll electrode only in an arrangement in which the current flowing through the conductive members 41,42 is shunted evenly.

The location in which the slider S slides and contacts the rolls can be anywhere. That is, it is not limited to around the rotary shaft as shown in FIG. 1(a) so long as the electrical connection is properly maintained.

While the heating temperatures of strip W varies according to the applications, a water-cooled conduit is used as a primary coil 32 for higher heating temperature to prevent it from burning by radiation from the heated strip W.

Figure 1D:
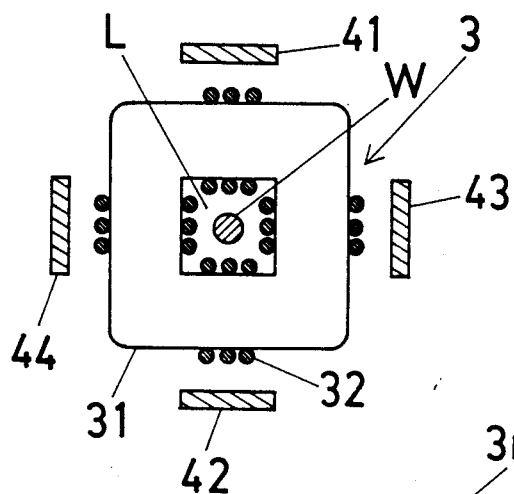
Figure 1E:
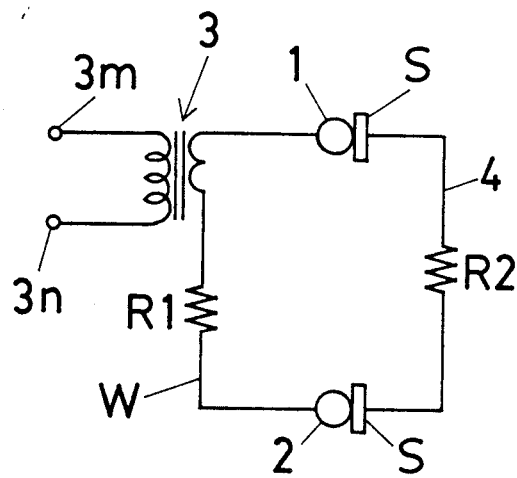

For wire or bar heating, the transformer 3 has an iron core 31 in cross sections such as octagon as shown in FIG. 1 (c), square as shown in FIG. 1(d) or circle (not shown), which are wound as evenly as possible by the primary coil 32 in the peripheral direction so as to maintain its symmetry with respect to the wire-, bar- or the like(W)-feeding path L and also with conductive members 4 consisting of 41 to 48 arranged opposite to the primary coils 32.

The more circular is the cross section of the transformer, the more securely the electro-magnetic machine force is offset to provide more stable travelling of the strip W along the feeding path L through the annular core.

For wire or bar heating, the roll electrodes 1,2 must have a channel on their surface of the periphery to fit to the surface of the wire or bar.

The electrical circuit of this embodiment of the Invention is shown in FIG. 1 (e).

A transformer numbered 3 in the Figure is connected to a power supply (not shown) through the terminals $3m, 3n$ on the primary thereof.

A secondary closed circuit is formed consisting of the first and second roll electrodes 1,2 on the secondary of the transformer 3, the strip to be heated W located between both roll electrodes 1,2 in the circuit connecting between the said first and second roll electrodes and having the resistance R1, the sliders S, each of which slides and is in contact with each roll electrode respectively, the conductive member 4 in the circuit connecting the said one slider S with the other S and having the resistance R2.

R1 in the closed circuit on the said secondary represents the equivalent resistance of the strip to be heated W and R2 that of the conductive member 4 respectively.

The article to be heated W has relatively higher electrical resistance and the conductive member 4 has any dimension including cross-sectional area so that the relation between the resistance R1 of the strip W and the resistance R2 of the conductive member 4 can easily be set to give $$R1 >> R2.$$

In the above apparatus, a closed circuit is formed with the conductive member 4, which is of sufficiently low electrical resistance for retrace of the current and which is disposed in parallel and symmetry with respect to the strip-feeding path L on the periphery of the transformer 3 so that the current conducted through the strip W as a circuit has a much higher resistance than the conductive member 4 and thus heats the said strip W very efficiently.

The arrangement of the conductive member 4 which is a retrace, close to the primary coil 32 and in parallel and symmetry with respect to the feeding path L permits a lower secondary impedance than the primary, thereby reducing the voltage variations.

The transformer 3 is disposed between the first and second roll electrodes 1,2 with the strip W having sufficient resistance as the secondary so that the supply voltage is nearly consumed as load current for heating of the strip W located between the roll electrodes 1 and 2, with no-load voltage disappearing, resulting in little leaking outside of the heating zone. where U' is the voltage appearing outside, U is no-load voltage and $R1 >> R2$:

$$U' = \frac{R2}{R1 + R2} \times U$$

Figure 6A:
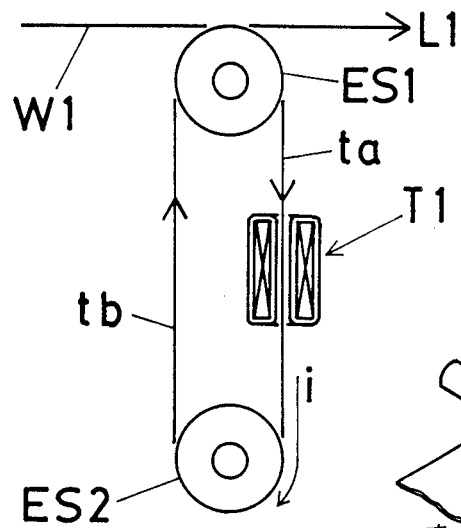
FIG. 6 (a) is a front view of a wire-heating apparatus of conventional sheave type.
Figure 6B:
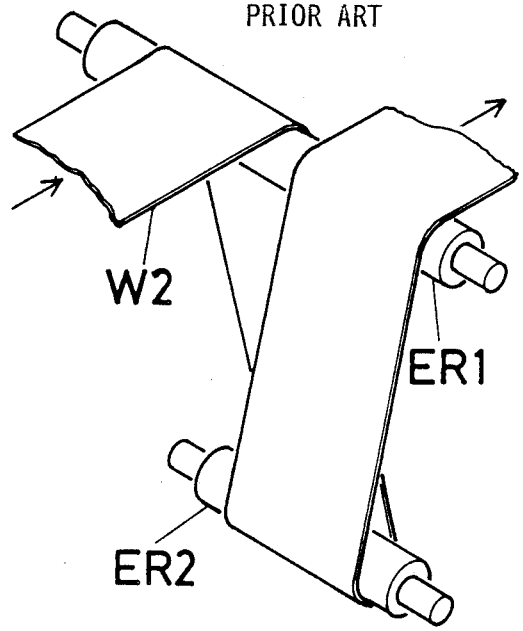
Figure 6B:
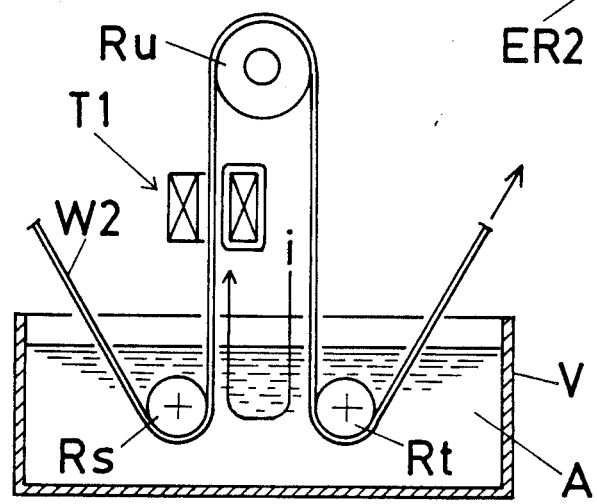

Reference is made to the difference of the present invention from the conventional sheave type as shown in FIG. 6 (a) or the conventional strip-heating apparatus provided with a transformer as shown in FIG. 7.

In the conventional sheave type or the like, the wire W1 travels along the paths ta and tb respectively so that the resistances of ta and tb are identical and the entire supply voltage is not consumed for heating of wire W1, thus the voltage applied to the sheave ES2 is one-half to one-third the voltage of the sheave ES1 when the current i in FIG. 6 flows in the arrow direction, the same relationship being applied to that between the roll Ru and the molten metal or salt A in FIG. 7.

On the other hand, in the present invention, the supply voltage as described above is nearly consumed up as the load current for heating the strip located between the roll electrodes 1,2 and no-load voltage disappears, this makes the present invention widely different from the sheave type.

Other enlarged embodiments of the invention are illustrated in FIGS. 2 (a) to (c).

The said apparatuses are applicable, for instance, to flexible strips for their heating.

FIG. 2 (a) is a front view of the apparatus embodying the present invention wherein 1,2 and 5 are the first, the second and the third electrodes respectively, 6(a) and 6(b) are auxiliary rolls respectively, 3a and 3b are the first and second annular transformers, 4a and 4b are conductive members disposed closely to the peripheries of each of the above transformers 3a and 3b, 7 is an uncoiler around which the strip W is wound, 8 is an arrangement of straightening rolls, and 9a and 9b are idler rolls. Each of the above roll electrodes 1,2 and 5 is disposed in location as shown in the Figure in a specified spacing along the strip(W), the feeding path L being shaped-U to form a processing line.

Figure 2B:
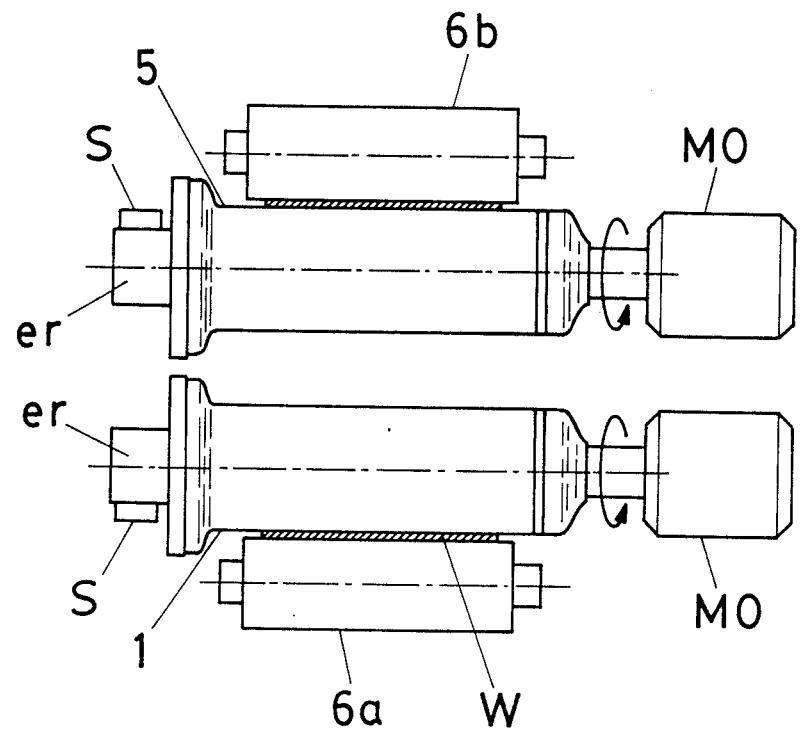
FIG. 2(a) is a front view of a different embodiment of the present invention.
FIG. 2 (b) is a side view taken on line Y—Y of FIG. 2(a).
FIG. 2(c) is a schematic diagram of an electrical circuit in the apparatus of FIG. 2(a).

Each electrode 1,2 and 5 is rotated in the arrow direction at a given rotational speed by a driving source MO as shown in FIG. 2(b).

The above given rotational speed is a speed at which the circumferencial speeds of each roll electrode 1,2 and 5 are fully synchronized.

Power receivers er are provided at the opposite side of the above drive source MO on the driven shaft and have contact with a slider S connected to the conductive member 4.

The above freely rotatable auxiliary rolls 6a, 6b are each opposingly arranged to form a given gap from each of the roll electrodes 1,5, wherein for instance the auxiliary roll 6a employs hard rubber and the like for its roll because of the strips being still at lower temperatures and the auxiliary roll 6b is ceramic-coated because of the strips being heated.

The above gap is arranged so as to permit the strips W to travel along the peripheral surface of each electrode and keep in close contact therewith.

The straightening rolls 8 straighten the strips w which had been coiled around uncoiler 7.

Idler rolls 9a and 9b tension the travelling strip w in order to permit it to travel along within a given arc on the periphery of the second roll electrode 2 and in close contact therewith.

The construction and arrangement of each electrode 1,2 and 5 and of each conductive member 4a, 4b are the same as in the above embodiment of the apparatus except that each conductive member 4a, 4b is connected to the second roll electrode 2 respectively through the slider S.

In the above arrangement, the strip W uncoiled from the uncoiler 7 travels along in close contact with the first electrode 1 via the straightening rolls 8 through the annular first transformer 3a, advances toward the second transformer 3b after having turned around a given range of the peripheral surface of the second roll electrode 2 in close contact therewith, and travels in close contact with the third roll electrode 5 after having passed through the said annular second transformer 3b.

Figure 2C:
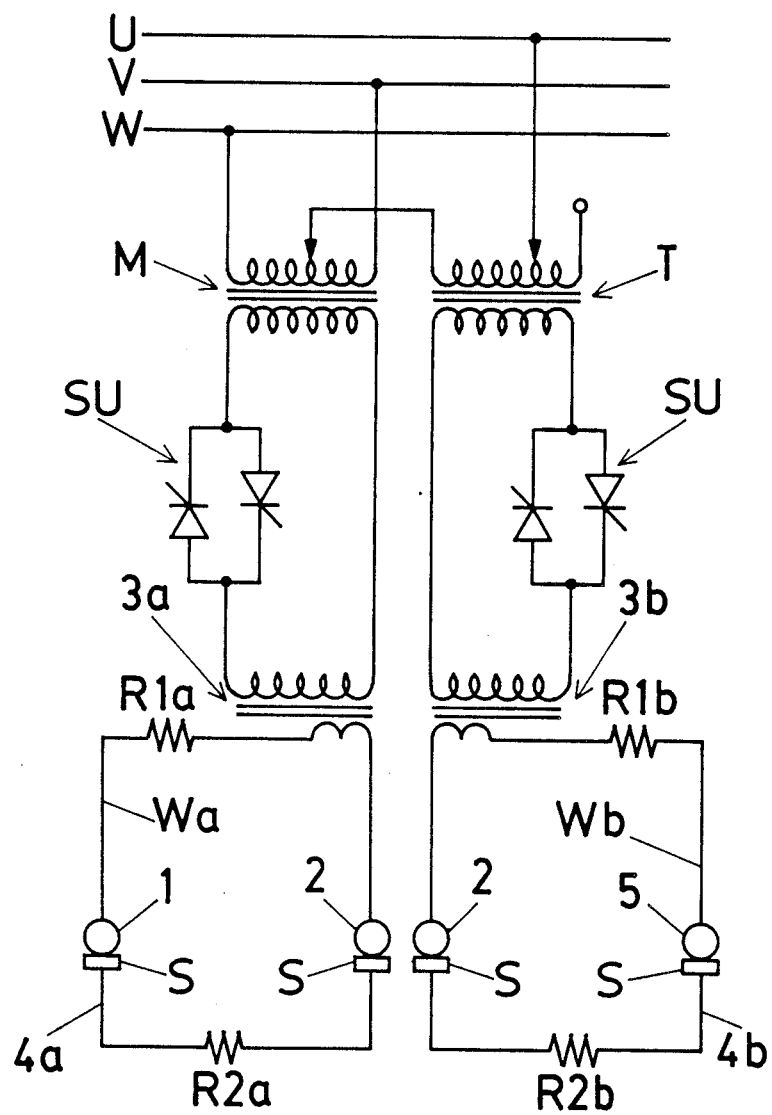

The electrical circuit configuration of the said apparatus is shown in FIG. 2(c) wherein M and T are single-phase transformers respectively of which the primary is connected to a three-phase power source in the Scott connection, with the secondary of the transformer M being connected to the first transformer 3a and the secondary of the transformer T to the second transformer 3b through the power controlling switch SU.

The secondary of the above first transformer 3a is a closed circuit formed by a travelling strip Wa located between the first and second roll electrodes 1,2 and by a conductive member 4a located between sliders S and S connected respectively to the first and second roll electrodes 1,2 with R1a representing the equivalent resistance of the strip Wa, and R2a that of the conductive member 4a respectively.

The secondary of the said second transformer 3b is a closed circuit formed by a travelling strip Wb located between the second and third roll electrode 2,5 and by a conductive member 4b located between sliders S and S connected respectively to the second and third roll electrodes 2,5 with R1b representing the equivalent resistance of the strip Wb, and R2b that of the conductive member 4b respectively.

The said apparatus has in addition to the functions pertaining to the apparatus shown in FIG. 1 the advantage that there is no imbalance in three-phase voltage. This is due to the arrangement of feeding the three-phase power source through both of the single-phase transformers in the Scott connection, thus eliminating a balancer requiring ingenuity to use, while permiting very easy arrangement of the three-phase load.

Figure 3:
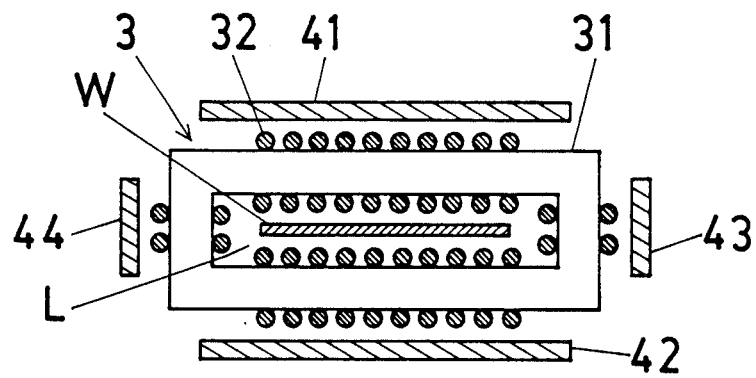
FIG. 3 is a cross section illustrating an embodiment of the transformer used in the present invention.

In the transformer 3 of the present invention, the primary coil 32 may be wound up and down the iron core 31 and on the right and left side of the annulus as shown in FIG. 3.

In this case, the conductive members 4 are disposed up and down, right and left of the core like 41 to 44 and so arranged as to maintain symmetry with respect to the feeding path L.

Figure 4A:
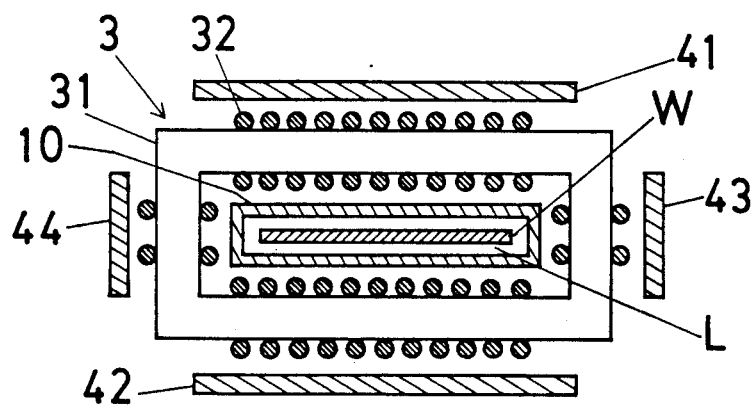
FIG. 4 (a) and (b) are cross sections of other embodiments of the transformer used in the present invention.
Figure 4B:
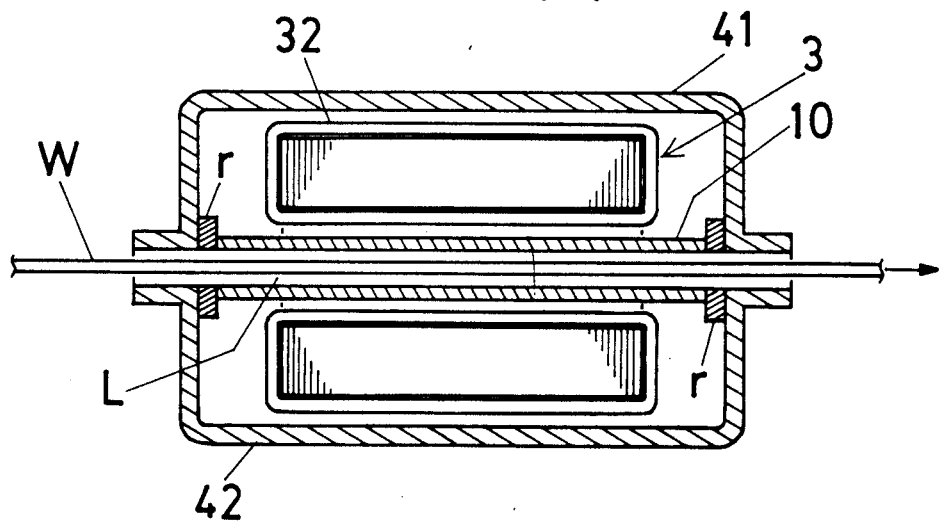
Figure 5A:
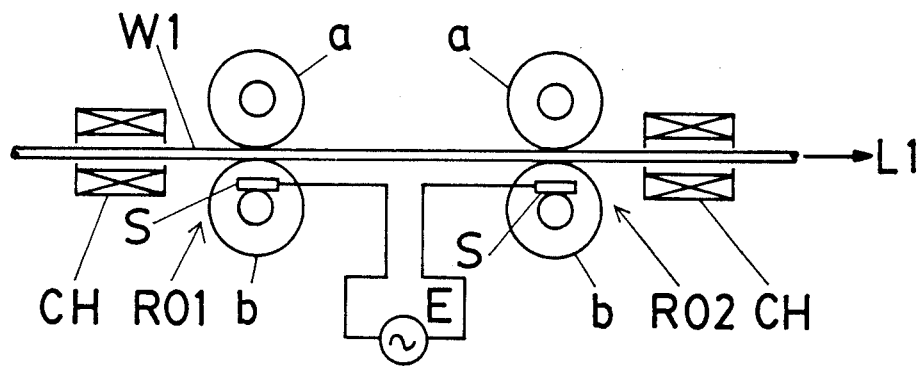
FIGS. 5 (a) to (c) are front views of conventional direct-resistance-heating apparatus of the external power supply type, respectively.
Figure 5B:
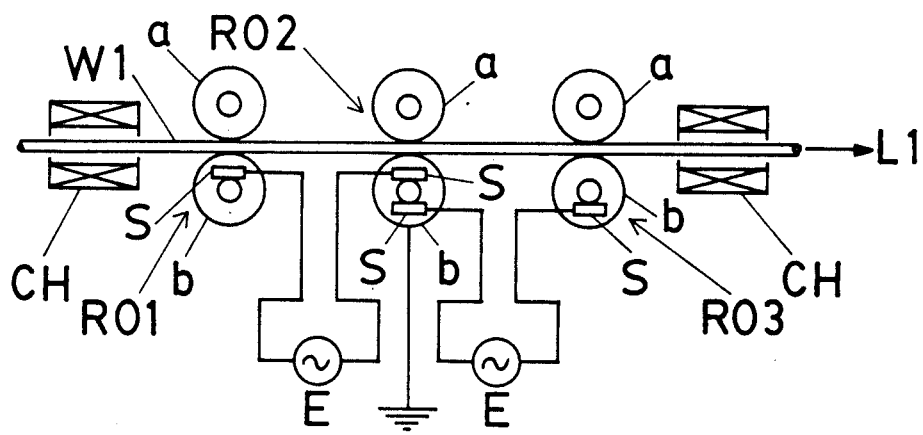
Figure 5C:
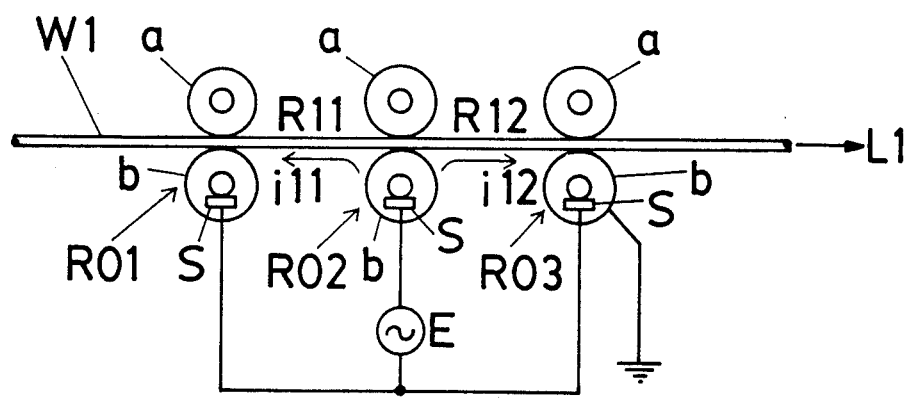

In some cases, the transformer 3 is formed as shown in FIGS. 4 (a) and (b) wherein 10 is a cylindrical body, has a cross section which encloses a travelling strip W along the feeding path L through the annulus, and is held by the conductive members 4 through insulators r.

In the said arrangement, oxygen shortage within the cylinder 10 prevents the heated strips W from oxidizing.

Filling the hollow body 10 with an inert gas provides more thorough prevention of oxidation, preventing sparking between the strip W and the electrode from being developed due to the surface oxidation in the strip W, thus contributing to both high quality assurance and prolonged life of the electrode.

The present invention is not limited to the methods disclosed above wherein the arrangement of causing the strip W to travel in close contact with each electrode has been described in reference to FIG. 1(a) using opposed roll electrodes 1,2 consisting of rolls a,b and to the use of auxiliary rolls 6a,6b in FIG. 2(a) or to the method of causing the strip W to tensioned by means of idler rolls 9a and 9b for smooth turning of the strip W around a specified arc, in close contact therewith, on the circumferential surface of the second roll electrode 2.

As a matter of course the opposed electrodes 1 and 2 in FIG. 1(a) may be used as a roll electrode in FIG. 2(a), or conversely auxiliary rolls 6 in FIG. 2(a) may be replaced with the opposed roll electrodes 1,2 in FIG. 1.

The embodiment of the invention shown in FIG. 2(a) relates to flexible strips W and the U-shaped feeding path L. However, linear arrangement may of course be used when applied to non-flexible strips or to flexible strips when there is enough room for installation.

In the above Figures and descriptions of the apparatus under the present invention, primary coil 32 in transformer 3 is so wound around core 32 as to be in symmetry to travelling path L for strips or wires.

However, the present invention is not limited to said winding arrangement.

If, for example, a strip W is capable of being made to travel linearly against the above electromagnetic machine force under sufficient tension, primary coil 32 may function properly, as does the above embodiment of the invention, even if said primary coil is not wound in symmetry to strip-travelling path L.

Conductive members 4 are so arranged as to be in symmetry and parallel to travelling path L for strip, wire or the like in the above Figures of the embodiment of the present invention and description thereof.

Said arrangement is, however, required only for the optimum condition from an electrical standpoint.

The present invention is not limited to said arrangement.

For instance, conductive members 4 may be arranged asymmetrically with respect to travelling path L for strip w if the design of the apparatus does not permit the above arrangement, provided that the effect of low impedance on the secondary with respect to the primary is reduced.

While the above drawings and descriptions are concerned mainly with heating of strips, the present invention is also applicable to heating of long-length articles such as wire, bar or continuous pipe or shape and the like wherein the transformer is in annular shape to permit unhindered travelling of the articles for heating wherein the circumferential surface configuration of the roll electrode is such as to allow it to energize the article for heating in close contact therewith with the conductive members being provided according to the above requirements, thereby producing similar functions and effects as to the above embodiments.

The direct-resistance-heating apparatus of the present invention provides uniform heating of long-length articles such as strips, wires, bars, and the like being fed continuously, and provides a great improvement in the quality of the products as well as an exceedingly high heating efficiency.

The said apparatus has the additional advantage of insuring safety by allowing little leakage outside of the heating zone because of the extremely low voltage on the secondary, whereas the conventional sheave type involves greater hazard as the insulated construction of the sheave requires higher voltage.

A further advantage of the present invention is the elimination of the need for a current-limiting reactor which has been indispensable for the conventional external power source type. This permits the apparatus to be of a smaller size and thus provides for a shorter processing line, thereby enabling easy insertion and installation of the equipment between the apparatuses in the manufacturing line without requiring insulation for the other equipment in the line as well as for the apparatus of the present invention.

Furthermore, the adoption of the apparatus in the above embodiment of FIG. 2 has in addition to the above, the effect of readily preventing imbalance of the three-phase voltage, eliminating a balancer, achieving even smaller size of the apparatus and cost reduction. As described in the above, the present invention has outstanding advantages and extensive applications.

What is claimed is:

1. An apparatus for direct-resistance heating of a continuously-fed elongated article, comprising:
    first and second roll electrodes disposed in a predetermined spaced apart relation along a feeding path of the elongated article, such that the elongated article can travel along the feeding path in close contact with peripheral surfaces of said first and second roll electrodes, respectively;
    an annular transformer mounted between said first and second roll electrodes such that the feeding path extends through the annulus of said annular transformer;
    a primary coil, having a predetermined length, wound about said annular transformer;
    conductive members extending between said first and second roll electrodes and extending substantially longitudinally of said annular transformer; and
    sliders connecting each respective end of each of said conductive members to a respective one of said first and second roll electrodes; and
    wherein the electrical resistance R1 of the elongated article and the electrical resistance R2 of said conducting members are related such that $R1 >> R2$.

2. An apparatus as recited in claim 1, wherein said conductive members are mounted along a longitudinal periphery of said transformer.

3. An apparatus as recited in claim 1, wherein said first and second roll electrodes are adapted to permit at least one of a strip-shaped, wire-shaped and bar-shaped elongated article to travel along peripheral surfaces of said first and second roll electrodes in close contact therewith.

4. An apparatus as recited in claim 1, wherein said first and second roll electrodes each comprise first and second rolls respectively mounted in spaced apart opposing relationships so as to form predetermined gaps therebetween through which said elongated article is adapted to travel.

5. An apparatus as recited in claim 4, wherein one of said first and second rolls of each of said first and second roll electrodes is an electrode.

6. An apparatus as recited in claim 4, wherein said first and second rolls of each of said first and second roll electrodes are electrodes.

7. An apparatus as recited in claim 1, further comprising
    means for tensioning the elongated article so that it wraps around a predetermined portion of the periphery of one of said first and second roll electrodes.

8. An apparatus as recited in claim 1, further comprising
    a hollow body mounted within said annulus of said annular transformer and adapted to have the long-length article travel therethrough.

9. An apparatus as recited in claim 8, further comprising
    inert gas disposed within said hollow body.

10. An apparatus for direct-resistance heating of a continuously-fed elongated article, comprising:
    first, second and third roll electrodes disposed in a predetermined spaced apart relation along a feeding path of the elongated article, such that the elongated article can travel along the feeding path in close contact with the peripheral surfaces of said first, second and third roll electrodes, respectively;
    a first annular transformer mounted between said first and second roll electrodes such that the feeding path extends through the annulus of said first annular transformer;
    a second annular transformer mounted between said second and third roll electrodes such that the feeding path extends through the annulus of said second annular transformer;
    at least one conductive member extending between said first and second roll electrodes and extending substantially longitudinally of said first annular transformer;
    at least one conductive member extending between said second and third roll electrodes and extending substantially longitudinally of said second annular transformer; and
    sliders connecting each respective end of each of said conductive members to a respective end of each of said conductive members to a respective one of said first, second and third roll electrodes; and wherein the electrical resistance R1 of the elongated article and the electrical resistance R2 of said conducting members are related such that $R1 >> R2$.

11. An apparatus as recited in claim 10, wherein said first and second transformers include first and second primary coils, respectively;

first and second single-phase transformers are electrically connected to said first and second primary coils, respectively; and a three-phase power supply is electrically connected to said first and second single-phase transformers via a Scott connection.

12. An apparatus as recited in claim 11, wherein said conductive members are, respectively, mounted along longitudinal peripheries of said first and second annular transformers.

13. An apparatus as recited in claim 10, wherein said first, second and third roll electrodes are adapted to permit at least one of a strip-shaped, wire-shaped and bar-shaped elongated article to travel along peripheral surfaces of said first, second and third roll electrodes in close contact therewith.

14. An apparatus as recited in claim 10, further comprising first and second auxiliary rolls mounted in spaced apart opposing relationships with said first and third roll electrodes, respectively, so as to form a predetermined gap therebetween through which the elongated article is adapted to travel.

15. An apparatus as recited in claim 14, wherein said feeding path is substantially U-shaped.

16. An apparatus as recited in claim 15, further comprising means for tensioning the elongated article so that it wraps around a predetermined portion of the periphery of said second roll electrode.

17. An apparatus as recited in claim 10, further comprising a hollow body mounted within the annulus of at least one of said first and second annular transformers and adapted to have the elongated article travel therethrough.

18. An apparatus as recited in claim 17, further comprising inert gas disposed within said hollow body.

19. An apparatus as recited in claim 10, further comprising first and second hollow bodies mounted within the annulus of each of said first and second annular transformers, respectively, and adapted to have the elongated article travel therethrough.

* * * * *